United States Patent

[11] 3,627,710

| [72] | Inventor | James Walter Crary |
| | | Wilmington, Del. |
| [21] | Appl. No. | 834,903 |
| [22] | Filed | June 19, 1969 |
| [45] | Patented | Dec. 14, 1971 |
| [73] | Assignee | E. I. du Pont de Nemours and Company |
| | | Wilmington, Del. |

[54] ISOCYANATE-MODIFIED NEOPRENE FOAM PROCESS
4 Claims, No Drawings

[52] U.S. Cl. ........................................ 260/2.5 L,
5/337, 5/361 B, 260/2.5 AT, 260/29.7 N
[51] Int. Cl. ........................................ C08f 47/08,
C08f 47/18
[50] Field of Search ............................ 260/2.5 L,
29.7 AT, 29.7 N, 2.5 AT

[56] References Cited
UNITED STATES PATENTS
3,450,649  6/1969  Youker ........................ 260/29.7 N
OTHER REFERENCES
Carl; Neoprene Latex; TS 1925 C25 pp. 18, 19, 89– 94

*Primary Examiner*—Murray Tillman
*Assistant Examiner*—Wilbert J. Briggs, Sr.
*Attorney*—Raymond E. Blomstedt

ABSTRACT: In the process of making polyisocyanate-modified neoprene foams it is necessary to lower the pH of the latex to within the 9.5–10.8 range prior to the polyisocyanate addition. This is conveniently accomplished by adding to the latex a strong acid salt of morpholine, diethanolamine, di-(2-propanol)amine, or ethanol(2-propanol)amine. Foams produced from such a latex have excellent resilience and load-bearing capacity.

ISOCYANATE-MODIFIED NEOPRENE FOAM PROCESS

BACKGROUND OF THE INVENTION

This invention relates to a process for the preparation of polychloroprene foams modified with a polyisocyanate. In particular, it relates to pH control of polychloroprene latices prior to the isocyanate addition.

Polychloroprene (neoprene) foams are well known in the art. They can be prepared from neoprene latex as discussed in "Neoprene Latex" by John C. Carl, E. I. du Pont de Nemours & Co., pp. 89–94 (1962). This reference also discloses that, on equal density basis, neoprene foam has a lower load-carrying capacity than natural rubber/S.B.R. foams (ibid., page 93). It is now known that the load-bearing capacity of a neoprene foam can be improved by incorporating into the latex an organic polyisocyanate in the proportion of about 10–100 parts by weight per 100 parts of the elastomer. Because fresh neoprene latices have a rather high alkalinity, a pH of more than about 12 being quite commonplace, it is desirable for the preparation of good quality foams to adjust the pH to about 9.5–10.8 prior to the addition of the polyisocyanate. This can be accomplished by aging the neoprene latex at room temperature for several weeks or months, or at elevated temperatures for at least several hours.

Although aged neoprene latex gives excellent polyisocyanate-modified foams, the aging process itself is quite time consuming and inefficient. Yet, rapid and simple methods of lowering the pH of neoprene latices have not proved to be practical. Thus, addition of weak acids does not lead to a suitable latex because the resulting foams have poor physical properties. Use of strong acids requires addition of the acid at a very high dilution to prevent premature gelation of the foam, and this unduly increases the volume of the latex. A simple and rapid method of adjusting neoprene latex pH to the 9.5–10.8 range while maintaining good physical properties of polyisocyanate-modified foams made from the latex is, therefore, much needed.

SUMMARY OF THE INVENTION

According to this invention, polyisocyanate-modified neoprene foams having excellent resilience and load-bearing capacity are prepared from a neoprene latex whose pH has been adjusted to about 9.5–10.8 prior to the polyisocyanate addition by adding to the latex a strong acid salt of at least one of the following amines: morpholine, diethanolamine, di(2-propanol)amine, and ethanol-(2-propanol)amine, or the like.

DETAILED DESCRIPTION OF THE INVENTION

An isocyanate-modified neoprene latex foam can be prepared according to this invention from commercially available latices. Neoprene latices are available in several ranges of solids contents. Latices which have not been concentrated (for example by "creaming" with sodium or ammonium alginate) normally have a total solids concentration of about 50 percent or less. Creamed latices usually have a concentration of about 58–60 percent.

Latices useful in this invention are usually concentrated prior to foaming, but the pH of a latex can be adjusted either before or after creaming. If it is done before creaming, it is desirable to adjust the pH to about 9.6–9.9. If the pH is not adjusted until after creaming, it is preferably brought to about 9.9–10.3. Generally, polyisocyanate-modified foams of excellent load-bearing capacity and resilience can be made from neoprene latices adjusted to a pH of about 9.5–10.8, prior to the polyisocyanate addition.

Latices useful in this invention can be prepared by emulsifying chloroprene in water, usually in the presence of sodium rosinate soap, and polymerizing it in the presence of a catalyst, such as potassium persulfate. Because an excess of alkali is usually present in sodium rosinate, the pH of a freshly made neoprene latex often reaches the range of 11–13. Neoprene latex technology is well known, and a skilled technician can readily select the right type of latex for each application.

Foaming neoprene latices also is known in the art. Foam is prepared from neoprene latex by mechanically frothing the emulsion by whipping with air and adding a gelling agent, such as potassium silicofluoride.

In preparing a polyisocyanate-modified neoprene foam in accordance with this invention, the polyisocyanate is preferably added after the frothing stage. Addition of the polyisocyanate before or during the frothing step can cause premature coagulation which can impair the load-bearing characteristics of the final foam products. The polyisocyanates used in the preparation of modified neoprene foams usually are aromatic diisocyanates such as 2,4-toluenediisocyanate, 2,6-toluene-diisocyanate, 4,4'-methylenebis (phenyl isocyanate), m-phenylene diisocyanate, polymethylenepoly(phenyl isocyanate), and toluenediisocyanate distillation residues having isocyanate functionality greater than 2. An aliphatic diisocyanate, such as 4,4'-methylenebis)(cyclohexyl isocyanate) or decamethylene diisocyanate can also be used. All these isocyanates can be made by known methods, such as phosgenation of the corresponding diamines and polyamines and thermal decomposition of carbamoyl chloride intermediates. A polymethylenepoly(phenyl isocyanate) prepared substantially as described in U.S. Pat. No. 2,683,730 and containing about 50 percent by weight 4,4'-methylenebis(phenyl isocyanate) (known commercially as "PAPI") is especially suitable in this process. The amount of organic polyisocyanate which is added to a neoprene latex is about 10–100 parts by weight per 100 parts of elastomer in the latex.

The pH of a latex is adjusted to the proper range of about 9.5–10.8 either before of after frothing but prior to isocyanate addition. It is more convenient to adjust the pH before the frothing step. This is accomplished according to the present invention by adding a strong acid salt of one of the above-mentioned four amines. Morpholine and diethanolamine are readily available commercially at low cost and are therefore the most practical for this purpose.

Representative acids which can be used for the preparation of amine salts for the practice of this invention include hydrochloric acid, sulfuric acid, nitric acid, phosphoric acid, benzenesulfonic acid, hydrofluoric acid, hydriodic acid, trifluoroacetic acid, and trichloroacetic acid. Because of its low cost and ready availability, hydrochloric acid is the most suitable acid for the salt formation. Therefore, morpholine hydrochloride and diethanolamine hydrochloride are the two preferred salts which can be used in the present process.

There is a remarkable difference in effect between the pH-reducing agents of the present invention and, for instance, ammonium salts or amine salts outside this invention, such as for example triethanolammonium chloride. When ammonium chloride or amine salts of strong acids such as, for example, methanolammonium chloride or triethylammonium chloride are added to neoprene latex foam formulations, desirable isocyanate-modified foams having good process-ability and load-bearing capacity are not obtained.

An amine salt of this invention, such as for example diethanolamine hydrochloride, is usually added as a 15–25 percent aqueous solution. At this high concentration, it is desirable to also have about 5–15 percent of the free amine in the solution to maintain a pH of at least 8.5 and thus prevent local coagulation of the latex. A typical amine salt solution can be made by adding 17.7 grams of 37 percent aqueous hydrochloric acid to 100 grams of 30 percent aqueous diethanolamine. The pH of this solution is 8.8.

When adjusting the pH of neoprene latex formulations, it is desirable to keep the total amine content between 0.5 and 4.0 parts by weight of amine per 100 parts of chloroprene polymer, 1.0–2.5 parts being the preferred range. Since some neoprene latices contain a free amine such as for instance diethanolamine in their formulation, this amount must be taken into consideration when calculating the total amine present after pH adjustment. Amine, as defined for this purpose, is both free amine and amine bound in a salt. Amine concentrations exceeding about 4 parts per 100 interfere with good dispersion of the polyisocyanate and consequently give poor foams.

Foams prepared by the process of the present invention are particularly suitable for use in pillows, carpet backing, automobile cushions, mattresses and other applications, where good resilience and high load-bearing capacity are important. It is especially important that such good mechanical properties be combined with a low foam density. The load-bearing capacity of a foam can be determined by any suitable technique, such as for example subjecting a standard size foam sample to compression by a known weight and determining the change of the foam thickness.

All parts, proportions and percentages herein are by weight, unless otherwise indicated. The following examples illustrate some of the possible embodiments of the present invention.

Preparation of Neoprene Latex

Latex A:

Chloroprene (100 parts) containing 0.25 part of sulfur, 3 parts of disproportionated partially neutralized wood rosin, 1 part of wood rosin, and 2 parts of cyclohexanol is emulsified by mechanical agitation in 100 parts of water containing 0.7 part of sodium hydroxide, 0.5 part sodium methylenebisnaphthalenesulfonate, 2.0 parts C-cetylbetaine and 0.005 part of sodium salt of naphthalene-β-sulfonic acid. The emulsion is kept at 40° C. while 0.26 part of potassium persulfate is added, until polymerization is substantially complete. Two parts of diethanolamine are added for example 1, below. Latex A contains approximately 50 percent solids. The pH of Latex A is adjusted by the process of the present invention, as shown in examples 4, 5 and 6. The latex is then creamed with ammonium alginate, substantially as described below for Latex B, except that no diethanolamine is added.

Latex B:

This latex is obtained by creaming Latex A whose pH has not been adjusted to the 9.5-10.8 range. Two parts of diethanolamine per 100 parts chloroprene are added to Latex A. The emulsion is creamed to 58-60 percent solids by the addition of an ammonium alginate solution prepared by mixing together 36.4 grams of ammonium alginate, 473 grams sodium lauryl sulfate, and 3,450 grams water. About 6-8 parts of this solution are added to 100 parts of Latex A. The resulting mixture is well stirred and set aside at room temperature for 72 hours. During this time, a separation into two phases occurs, the lower phase being the concentrated Latex B. This is separated by decantation from the serum, which contains only a small amount of neoprene. The pH of Latex B is adjusted by the present process, as shown in Examples 2 and 3 below.

General Procedure for Foam Formation

Isocyanate-modified neoprene foams are prepared by compounding neoprene with other ingredients, as shown below (dry weight basis)

| | Parts |
|---|---|
| Neoprene (creamed Latex A or B) | 100 (on dry basis) |
| Petrolatum | 3 |
| Zinc oxide | 7.5 |
| Phenyl-β-naphthylamine | 2 |
| Trialkylthiourea | 2 |
| Sodium dibutyldithiocarbamate | 1 |

As discussed above, the pH of latex can be brought within the desired range either prior to or after creaming. Compounding ingredients are added as emulsions, dispersions of solutions depending on their commercial form. The compounded latex is fully expanded (frothed) with air using a planetary mixer (Hobart Model 210). The mixer is equipped with a three-quart bowl and a matching whisk, which travels around the periphery of the bowl. The whisk also revolves around its axis, 2.375 such revolutions being completed during one orbit around the periphery of the bowl. Mixing is first done at a high speed of about 475 r.p.m. (200 orbits/min.) for 2-3 minutes, and the expanded latex is "refined" to produce a more uniform cell size by mixing at a speed of about 266 r.p.m. (112 orbits/min.) for 6-9 minutes. Total mixing time is 9-11 minutes. Then, 20 parts of undiluted polymethylenepolyphenyl isocyanate [Upjonh's "PAPI," which is typically about 50 percent methylenebis (phenyl isocyanate) and the remainder polymethylene poly (phenyl isocyanate) of functionality greater than 2] is added and mixed for 30-45 seconds; 2.0 parts of potassium silicofluoride is added, mixing continued for another 30- 45 seconds, and the foam poured into molds. Solidification occurs within 1-3 minutes after cessation of mixing. The foam is cured for 6 hours at 120° C., and its load-bearing capacity is tested and compared to that of the foam of example 1 on an equal density basis. The test results are presented in table I.

EXAMPLE 1

(Control experiment, outside the scope of this invention)

Latex type A containing 2 parts of diethanolamine and having a pH of 12.3 is heated for 72 hours at 70° C. This heating lowers the pH to 9.8. The pH further decreases on standing 9.5.

EXAMPLE 2

Latex type B having a pH of 10.7 is adjusted in alkalinity by addition of an aqueous solution containing 9.5 percent of diethanolamine (DEA) and 21.5 percent of diethanolammonium chloride (DEA·HCl) in amounts sufficient to lower the pH as follows:

| | Mixed solution DEA + DFA·HCl parts/100 latex | Latex pH |
|---|---|---|
| (a) | — | 10.7 |
| (b) | 0.4 | 10.3 |
| (c) | 0.8 | 10.1 |
| (d) | 1.2 | 9.9 |

EXAMPLE 3

A latex type B is adjusted from an initial pH of 11.3 to a pH of 9.9 by addition of 5.1 parts of a mixed aqueous solution of morpholine (1.7 percent) and morpholine hydrochloride (6.1 percent) to each 100 parts of neoprene latex.

EXAMPLE 4

A latex type A of 50 percent solids containing no diethanolamine is adjusted from an initial pH of 12.3 to 9.8 by addition of 3.6 parts of an aqueous solution containing 14.1 percent diethanolamine and 16.7 percent diethanolammonium chloride to each 100 parts of latex. After the additional creaming step, the pH declines to 9.6.

EXAMPLE 5

A latex type A containing no diethanolamine is adjusted from an initial pH of 12.5 to 9.5 by addition of 5.0 parts of a solution containing 4.5 percent diethanolamine and 19.4 percent diethanolammonium nitrate to each 100 parts of latex.

EXAMPLE 6

A latex type A (50 percent solids) made without diethanolamine is adjusted from a pH of 12.5 to 9.5 by addition of 4.1 parts of solution containing 9.6 percent diethanolamine and 20.4 percent diethanolammonium sulfate, to 100 parts of latex.

Determination of Load-Bearing

Capacities (compression/deflection ratios)

Foam specimens of examples 1-6 measuring 3.8 cm. ×3.8 cm. in cross section and having lengths of 3.8-5.08 cm. are subjected to increasing loads in stepwise manner. Deflection of the specimen, measured with a thickness gauge, is plotted against load. The compression force required to cause a 50 percent deflection from the original foam height is determined from the plot and expressed in kgs./sq. cm. All force data in table I are corrected to the same foam density of 0.096 g./cu. cm.

The results obtained with samples from examples 1-6 above, are tabulated below. Load-bearing capacities of isocyanate-modified foams prepared according to the process of the present invention are compared with the load-bearing capacity of the foam of example 1 prepared from a latex whose pH has been reduced by merely heating at 70° C. for 72 hours. The ratio of the load-bearing capacity of the invention samples to the load-bearing capacity of the prior art product of example 1 is shown in table I as Relative Load-bearing Capacity.

TABLE I

| Example No. | Type Latex | Final* Latex pH | Force for 50% deflection | Relative Load-bearing Capacity |
| --- | --- | --- | --- | --- |
| 1** | A | 9.5 | 0.119 | 1.00 |
| 2a | B | 10.7 | 0.105 | 0.88 |
| 2b | B | 10.3 | 0.140 | 1.18 |
| 2c | B | 10.1 | 0.175 | 1.47 |
| 2d | B | 9.9 | 0.161 | 1.35 |
| 3 | B | 9.9 | 0.147 | 1.24 |
| 4 | A | 9.6 | 0.126 | 1.06 |
| 5 | A | 9.5 | 0.112 | 0.94 |
| 6 | A | 9.5 | 0.126 | 1.06 |

*just prior to foaming

**not within the scope of this invention

The above table shows that in virtually all cases where the pH of a latex is adjusted to the desired 9.5–10.8 pH range according to the present process, the isocyanate-modified foams made therefrom have load-bearing capacities at least as good as those made from a latex which has been heated to reduce its pH.

I claim:

1. In a process for making a polyisocyanate-modified foam from a polychloroprene latex which process includes adjusting the pH of the latex from greater than about 10.8 to about 9.5–10.8, the improvement consisting essentially of making this pH adjustment by adding to the latex a strong acid salt of an amine selected from the group consisting of morpholine, diethanolamine, di(2-propanol)amine, and ethanol(2-propanol)-amine.

2. The process of claim 1, where the amine salt is diethanolammonium chloride.

3. The process of claim 1, where the amine salt is diethanolammonium sulfate.

4. The process of claim 1, where the amine salt is diethanolammonium nitrate.

* * * * *